United States Patent
Bihel

(10) Patent No.: US 9,115,735 B2
(45) Date of Patent: Aug. 25, 2015

(54) METHOD OF DETERMINING THE STATIC FORCE DEVELOPED BY A SERVO-CONTROL

(75) Inventor: Jean-Romain Bihel, Le Rove (FR)

(73) Assignee: Airbus Helicopters, Marignane Cedex (FR)

( * ) Notice: Subject to any disclaimer, the term of this patent is extended or adjusted under 35 U.S.C. 154(b) by 522 days.

(21) Appl. No.: 13/477,342

(22) Filed: May 22, 2012

(65) Prior Publication Data

US 2012/0303296 A1 Nov. 29, 2012

(30) Foreign Application Priority Data

May 25, 2011 (FR) ...................................... 11 01611

(51) Int. Cl.
*F15B 15/28* (2006.01)
*F15B 20/00* (2006.01)
*G01L 1/02* (2006.01)

(52) U.S. Cl.
CPC ........... *F15B 15/2815* (2013.01); *F15B 20/007* (2013.01); *G01L 1/02* (2013.01); *F15B 2211/6336* (2013.01)

(58) Field of Classification Search
CPC .... B64C 21/00; B64C 21/001; B64C 27/473; Y02T 50/34
See application file for complete search history.

(56) References Cited

U.S. PATENT DOCUMENTS

| | | | |
|---|---|---|---|
| 3,892,164 A | 7/1975 | Magor | |
| 3,949,645 A * | 4/1976 | Masclet | 91/459 |
| 4,793,188 A * | 12/1988 | Strasser et al. | 73/745 |
| 5,865,602 A * | 2/1999 | Nozari | 417/44.1 |
| 7,306,009 B2 * | 12/2007 | Harvey et al. | 137/625.69 |
| 7,318,292 B2 | 1/2008 | Helbling et al. | |
| 8,301,276 B2 | 10/2012 | Tautz et al. | |
| 2004/0128868 A1 | 7/2004 | Helbling | |
| 2009/0138212 A1* | 5/2009 | Maruyama | 702/34 |
| 2010/0057321 A1 | 3/2010 | Randler et al. | |
| 2010/0294125 A1* | 11/2010 | Tautz et al. | 91/363 R |

(Continued)

FOREIGN PATENT DOCUMENTS

CN 100353078 C 12/2007
CN 101842760 A 9/2010

(Continued)

OTHER PUBLICATIONS

Bayanyan, Zhang Xiao-yan, "The Discussion of Bernoulli Equation Under Dissimilar Condition Each Physics Significance" Journal of Inner Mongolia University for Nationalitie, vol. 23, No. 3, May 2008, pp. 260-261.

*Primary Examiner* — John Breene
*Assistant Examiner* — Jeffrey Aiello
(74) *Attorney, Agent, or Firm* — Brooks Kushman P.C.

(57) ABSTRACT

The present invention relates to a method of determining the static force developed by a servo-control (10) having an actuator (20) and a hydraulic distributor control valve (30), with the actuator (20) including at least one cylinder (21) and a slidable element (25). The method comprises determining an instantaneous travel speed of the slidable element (25) relative to the cylinder (21) and determining the static force based at least in part on the instantaneous static force developed by the servo-control (10), the predetermined maximum static force, the instantaneous travel speed raised to the second power, and the maximum travel speed of the slidable element (25) relative to the cylinder (21) raised to the second power.

8 Claims, 2 Drawing Sheets

(56) References Cited

U.S. PATENT DOCUMENTS

| | | |
|---|---|---|
| 2011/0030547 A1 | 2/2011 | Depiak et al. |
| 2012/0011840 A1* | 1/2012 | Bihel et al. .................. 60/445 |
| 2012/0283982 A1* | 11/2012 | Englund .................. 702/124 |
| 2012/0303296 A1* | 11/2012 | Bihel .................. 702/41 |
| 2013/0132032 A1* | 5/2013 | McKeown .................. 702/182 |

FOREIGN PATENT DOCUMENTS

| | | |
|---|---|---|
| DE | 4335403 C1 * | 12/1994 |
| WO | WO 0114841 A1 * | 3/2001 |
| WO | 2008095525 A1 | 8/2008 |
| WO | WO 2008095525 A1 * | 8/2008 |

* cited by examiner

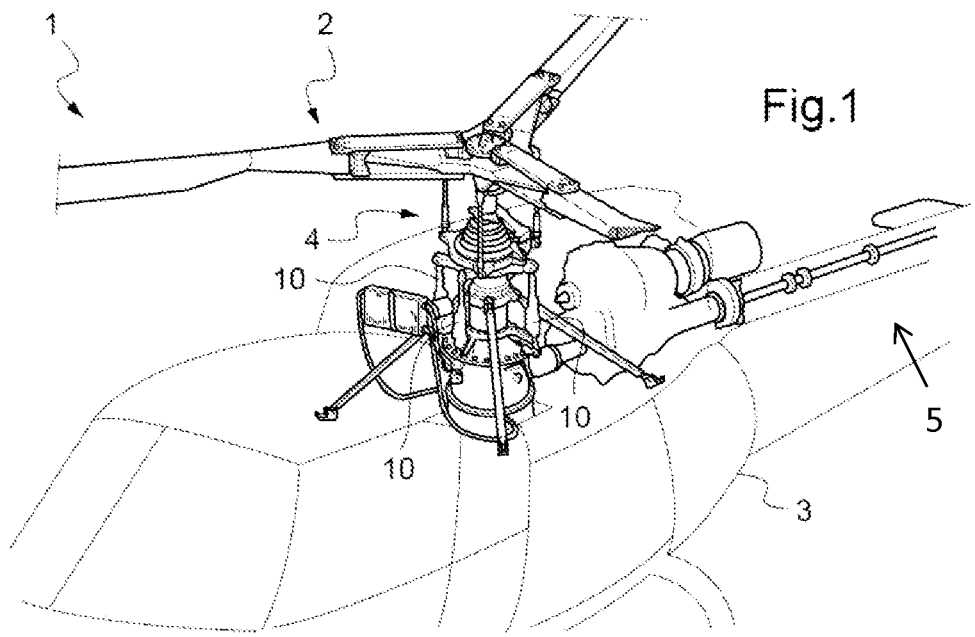
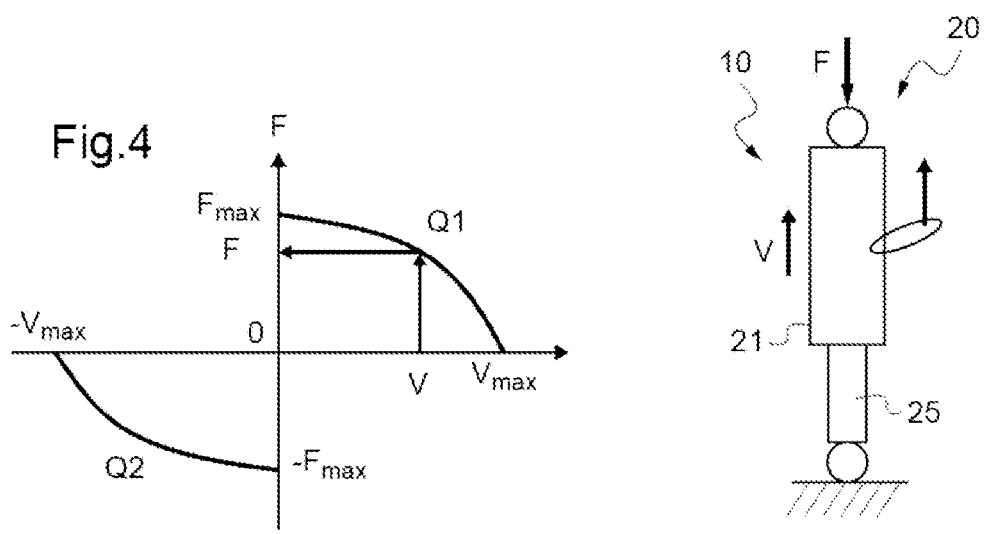
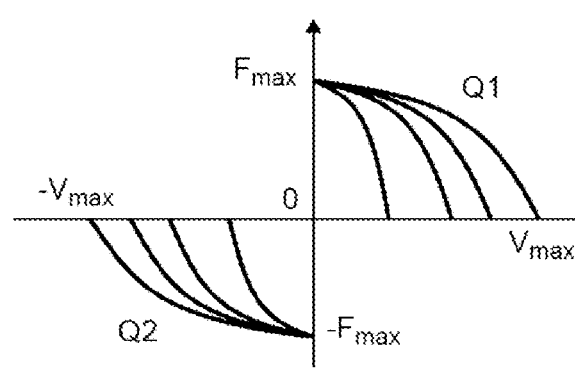

METHOD OF DETERMINING THE STATIC FORCE DEVELOPED BY A SERVO-CONTROL

CROSS REFERENCE TO RELATED APPLICATIONS

This application claims priority to FR 11 01611 filed on May 25, 2011, the disclosure of which is incorporated in its entirety by reference herein.

BACKGROUND OF THE INVENTION (1) Field of the Invention

The present invention relates to a method of determining the static force developed by a servo-control.

(2) Description of Related Art

Conventionally, an aircraft has controllable members that can be operated by a pilot, such as the blades of a lift rotor in a rotorcraft of the helicopter type, or indeed the control surfaces of an airplane, for example.

By using flight controls, the pilot thus operates the controllable members of the aircraft. Nevertheless, the forces that need to be exerted in order to move these controllable members are sometimes very large.

Consequently, the linkage connecting a flight control to a controllable member is often provided with a hydraulic system that includes a powered servo-control so as to enable the pilot to pilot the aircraft accurately and without difficulty.

More particularly, a helicopter is provided with a main rotor providing it with lift and propulsion. In order to control the flight of the helicopter, a pilot modifies the pitch of the blades of the main rotor, i.e. the angles of incident of the blades relative to the incident air flow.

As a result, the rotorcraft has a swashplate assembly provided with a non-rotary bottom swashplate and with a rotary top swashplate, with said assembly sometimes being referred to more simply as the "swashplate". The non-rotary bottom swashplate is connected to the pilot's flight controls, generally by three distinct lines, while the rotary top swashplate is connected to each of the blades by a respective pitch-control rod. The swashplate thus slides along the mast of the main rotor in order to control the general pitch of the blades of the main rotor, while also being capable of oscillating in all directions around a ball joint in order to control the cyclic pitch of the blades.

The oscillations and the vertical movement of the swashplate, under the control of the pilot, are thus at the origin of variations in the pitch of the blades that enables the pilot to control the helicopter.

Conventionally, the pilot controls the swashplate via mechanical controls that are connected thereto by connecting rods. Nevertheless, the forces the pilot needs to exert in order to move the swashplate are very large, in particular when the rotorcraft is a heavy rotorcraft.

Consequently, a hydraulically-powered servo-control is arranged between an upstream portion and a downstream portion of each control linkage. The pilot then acts on the servo-controls without exerting large amounts of force via the upstream portion, and the servo-controls then transcribe the orders from the pilot and act on the downstream portion of the linkage.

Similarly, a helicopter is provided with a tail rotor and the pitch of its blades can be modified by means of a servo-control.

Naturally, the same applies of the ailerons or the flaps of airplanes, which may be themselves operated by servo-controls.

It should be observed that certain modern aircraft have electric flight controls that replace mechanical connections connecting the flight controls to the servo-controls.

In conventional manner, servo-controls include an actuator having at least one outer member of cylindrical shape in which a slidable element moves in translation, said slidable element having a power rod carrying a control piston. The control piston defines a retraction chamber and an extension chamber inside the cylinder constituted by the outer member.

Furthermore, the servo-control includes a hydraulic distributor control valve that feeds fluid to the retraction chamber or to the extension chamber depending on the order it has received. The movement of the control piston of the slidable element relative to the outer cylinder is then controlled by the hydraulic distributor control valve, which is actuated by the flight controls of the helicopter pilot, acting via the upstream portion of a linkage. Depending on the orders given, the hydraulic distributor control valve feeds hydraulic fluid to the retraction chamber or to the extension chamber in order to request retraction or extension of the servo-control.

It will be understood that the term "retraction chamber" is used below to mean a chamber that causes the servo-control to retract when said chamber is filled with a fluid. Conversely, the term "extension chamber" is used to designate a chamber that causes the servo-control to extend when said chamber is filled with a fluid.

The servo-control may also include slaving means, optionally incorporated in the hydraulic distributor control valve.

Two servo-control configurations then coexist.

In a first configuration, the power rod is fastened to a stationary point of the aircraft, e.g. forming part of a main gearbox, with the cylinder moving as a function of the orders received and being connected to the downstream portion of the linkage. The person skilled in the art refers to that kind of servo-control as a "moving cylinder servo-control".

In contrast, in a second configuration, the cylinder is fastened to a stationary point of the aircraft, and it is the power rod that moves as a function of the orders received, and that is connected to the downstream portion of the linkage. The person skilled in the art then refers to that type of servo-control as a "stationary cylinder servo-control".

In addition, whatever the embodiment, the person skilled in the art is aware of so-called "single" cylinder servo-controls and so-called "dual" cylinder servo-controls.

A single cylinder servo-control then has an actuator provided with a cylinder defining a single inside space defining a retraction chamber and an extension chamber, which chambers are separated by a control piston. The retraction chamber and the extension chamber are then fed by a hydraulic distributor control valve that has a single hydraulic unit. The servo-control performs its function perfectly well. Nevertheless, for safety reasons and, above a certain level of force that needs to be developed, the person skilled in the art tends to make use of a servo-control having at least two cylinders.

A dual cylinder servo-control then has an actuator provided with a lower cylinder and an upper cylinder that are assembled together in tandem or in parallel.

For example, a tandem dual cylinder servo-control comprises a sliding element having a power rod carrying two pistons, each piston defining a retraction chamber and an extension chamber in a respective one of the cylinders.

Furthermore, two hydraulic units of the hydraulic distributor control valve that are actuated by a common control lever connected to the pilot's controls serve to feed the retraction and extension chambers of the lower and upper cylinders, respectively.

There also exist cylinders that have three or even more cylinders.

During a flight at high speed, extreme maneuvers of the aircraft may give rise to high levels of mechanical stress in the load-bearing structure of the aircraft. Beyond given load factors, there is a risk of damaging the structure.

In order to warn the pilot that the aircraft has reached a maneuvering limit, it is possible to provide a device for detecting a limit static force on a servo-control. When the static force exerted on the servo-control reaches a limit threshold, i.e. a traction static force or a compression static force, then the limit static force detection device triggers a warning to inform the pilot.

Conventionally, the limit static force detection device comprises a detector element having a rod fitted with a detection piston that slides in a detection space, the detection space comprising two detection chambers that are separated by the detection piston and that are independent of the retraction and extension chambers of the outer cylinder. The first detection chamber is fed with fluid by the hydraulic circuit of the aircraft, while the second detection chamber opens out to the outside of the servo-control.

In addition, the rod of the detection element projects from the cylinder of the servo-control so as to be connected to the downstream portion of the linkage, for example. This projecting portion of the detection element also includes a lever suitable for co-operating with a pushbutton switch.

Below the limit threshold, the pressure that exists in the detection chamber holds the detection piston in a high abutment position so as to keep its lever away from the switch. In contrast, when the threshold is reached, the pressure that exists in the detection control can no longer hold the detection piston in the high abutment position. The detection piston then reaches a low abutment position with the lever then actuating the switch.

In order to avoid fluid passing from the first detection chamber to outside the servo-control, the detection piston includes a sealing ring or gasket. Since the gasket is stressed dynamically, it is possible that leaks to the outside of the servo-control will appear and will require maintenance action.

Furthermore, the limit static force detection device is subjected to the forces to which the servo-control is subjected by being connected to the control linkage. Under such circumstances, it is dimensioned so as to be capable of withstanding said forces. This results in non-negligible costs and weight.

Finally, the sliding of the detection piston gives rise, in reality, to slack in the control linkage in the event of a drop of pressure in the hydraulic circuit feeding fluid to the limit static force detection device.

A servo-control is also known that has at least one limit force detection device. That device comprises a casing secured to the cylinder of the servo-control, the casing defining a detection space. Furthermore, a movable member subdivides this detection space into a first detection chamber opening out to an inside space of said cylinder, and a second detection chamber. Finally, the device possesses means for detecting the position of the movable member in the detection space.

The state of the art also includes Document WO 2008/095525, Document US 2004/0128868, and Document US 2010/0294125.

BRIEF SUMMARY OF THE INVENTION

The present invention thus has a particular object of proposing an alternative method and servo-control that make it possible in particular to overcome the above-mentioned limitations.

The invention thus provides a method of determining the static force developed by a servo-control having an actuator and a hydraulic distributor control valve, the actuator comprising at least one cylinder defining an inside space and a slidable element provided with a control piston slidable in said inside space, the hydraulic distributor control valve feeding the inside space with a fluid. The control piston advantageously subdivides the inside space of the cylinder into a retraction chamber and an extension chamber, with the hydraulic distributor control valve feeding the retraction chamber in order to retract the servo-control, and feeding the extension chamber in order to extend the servo-control. The method comprises in particular the following steps:

determining an instantaneous travel speed of said slidable element relative to said cylinder of the servo-control; and determining said static force with the help of:

the following first relationship when the instantaneous travel speed is positive:

$$F = F_{max} * \left[1 - \left(\frac{V^2}{V_{max}^2}\right)\right]$$

the following second relationship when the instantaneous travel speed is negative:

$$F = -F_{max} * \left[1 - \left(\frac{V^2}{V_{max}^2}\right)\right]$$

where F represents said static force developed by the servo-control, $F_{max}$ represents the predetermined maximum static force that can be developed by the servo-control, $V^2$ represents the measured instantaneous travel speed of the slidable element raised to the second power, $V^2_{max}$ represents a maximum travel speed of the slidable element relative to said cylinder and raised to the second power, and for example for an instantaneous opening at the time of measuring the hydraulic distributor control valve used for feeding said inside space with fluid, * represents the multiplication sign, and − represents the subtraction sign.

It can be understood that the servo-control may be a servo-control comprising one cylinder or a plurality of cylinders.

Furthermore, it should be observed that it is possible to measure the instantaneous travel speed by determining the travel of the cylinder on a moving cylinder servo-control, or by determining the travel of the sliding element on a stationary cylinder servo-control.

Under such circumstances, the hydraulic distributor control valve has a variable-section opening for feeding the chamber of the inside space, and the maximum travel speed $V_{max}$ corresponds to the travel speed of the slidable element in the event of no static force being applied on the servo-control.

In a variant, the maximum travel speed $V_{max}$ may be a constant, or it may be considered as being a variable that depends on the instantaneous section of the variable section, or indeed on the temperature of the fluid. It can be understood that the term "instantaneous section" is used to mean the value of the variable section at each instant, i.e. in real time.

In general, the term "instantaneous" is used to designate the value of a parameter in real time.

Thus, in this method, there is no need to provide a servo-control with a prior art limit static force detection device. By making use of operating parameters of the servo-control, it becomes possible to determine the static force that is being exerted on the servo-control, and to deduce therefrom whether or not the static force exceeds a threshold.

The method may also include one or more of the following additional characteristics.

Thus, according to an aspect of the invention, the method comprises:

determining the instantaneous travel speed of the slidable element relative to the cylinder of the servo-control with the help of a sensor for measuring the travel speed; and using a computer comprising a processor and a main memory storing instructions relating to said first relationship and to said second relationship to determine the static force with the help of said first and second relationships by executing said instructions with the processor.

For example, the sensor for measuring the travel speed may be:

a sensor for measuring speed as such;

a position sensor transmitting travel information relating to the distance traveled by the slidable element relative to said cylinder, said travel information being differentiated with respect to time in order to obtain said travel speed; or an acceleration sensor transmitting acceleration information relating to the acceleration of the slidable element or of the cylinder depending on the type of servo-control, said acceleration information being integrated with respect to time in order to obtain said travel speed.

In a variant, said instantaneous travel speed V is determined in real time by determining a flow rate of said fluid with the help of conventional flow rate measurement means, and then said flow rate is divided by the area of a constant section of the piston. It should be observed that the flow rate may be the flow rate of fluid through the hydraulic distributor control valve.

Furthermore, the maximum travel speed in a variant may be a constant that is predetermined by the manufacturer, possibly corresponding to the maximum travel speed of the slidable element when the opening of the hydraulic distributor control valve feeding the actuator is at its maximum and the fluid is at a maximum temperature in its expected utilization range.

In a variant, the hydraulic distributor control valve communicates with the inside space via an opening of variable section, the hydraulic distributor control valve having movable restriction means for adjusting the variable section, and it is possible to determine an instantaneous value for the variable section of the hydraulic distributor control valve.

It is thus possible by testing to establish a database giving the maximum travel speed as a function of the value of the instantaneous section and as a function of the temperature of the fluid, which value may correspond for example to the position of the restriction means. The computer then determines the instantaneous value of the variable section and deduces therefrom the maximum travel speed with the help of said database.

Nevertheless, in a preferred implementation, the maximum travel speed $V_{max}$ is determined in real time using the following equation:

$$V_{max} = C_q * S_1 * \frac{\sqrt{\left(\frac{2}{\rho}\right)*(P_{in} - P_{out})}}{S_0}$$

where $C_q$ represents a predetermined head loss coefficient of the hydraulic distributor control valve, $S_1$ represents an instantaneous value of the variable section, $\rho$ represents the density of the fluid fed to the servo-control, $P_{in}$ represents a feed pressure of the fluid entering into the hydraulic distributor control valve, $P_{out}$ represents the outlet pressure of the fluid leaving the hydraulic distributor control valve, $S_0$ represents the area of a constant section of the piston, and * represents the multiplication sign.

It should be observed that the outlet pressure represents the pressure of the fluid leaving the hydraulic distributor control valve, i.e. in fact the pressure of the fluid present in a chamber of the inside space fed by the hydraulic distributor control valve.

It should also be observed that the head loss coefficient $C_q$ corresponds to the head loss of the hydraulic distributor control valve between its inlet and its outlet, this coefficient being established by testing, and possibly being variable as a function of the temperature of the fluid, for example. Similarly, the density of the fluid may be a predetermined constant, or a variable that is established as a function of said fluid temperature.

Consequently, a processor of a computer acts for example by executing instructions to determine the instantaneous value of the variable section, by making use of a sensor for sensing the position or the movement of the restriction means or indeed of a control lever of the hydraulic distributor control valve, for example. The instantaneous section of the opening of the hydraulic distributor control valve depends directly on the position of the restriction means, so the computer can easily determine the instantaneous section.

The computer then deduces the maximum travel speed therefrom and then the static force exerted on the servo-control.

In addition, it should be observed that the outlet pressure from the hydraulic distributor control valve may be established from the inlet pressure of the hydraulic distributor control valve, possibly using an equation referred to as a "pressure" equation, for convenience.

Nevertheless, in a preferred variant seeking to simplify the invention while retaining acceptable accuracy, it is assumed that the outlet pressure is proportional to the inlet pressure, with the proportionality ratio being determined by testing, for example. The outlet pressure may be equal to half the inlet pressure, for example.

Surprisingly, it is found that when the slidable element moves relative to the cylinder at the maximum travel speed, this approximation turns out to be true. For a symmetrical servo-control, the outlet pressure then becomes more specifically equal to half the inlet pressure.

Furthermore, the head determine loss coefficient and the density may also be predetermined constants.

However, in a variant, it is possible to measure the temperature of the fluid, with the head loss coefficient and the density then being determined as a function of the fluid temperature.

A computer can then determine the head loss coefficient and the density with the help of databases, of stored curves, or indeed of equations that provide the head loss coefficient and the density as a function of said temperature.

In another aspect, a warning is triggered when the static force exceeds a predetermined threshold.

For example, the computer triggers a warning of audible or visible type. It can be understood that it is possible to perform other kinds of post-treatment after determining the static force.

In addition to a method, the invention also provides a device for implementing the method.

Thus, the invention provides a device for determining the static force developed by a servo-control having an actuator and a hydraulic distributor control valve, the actuator comprising at least a cylinder defining an inside space and a slidable element provided with a control system that is slidable in the inside space, the hydraulic distributor control valve feeding the inside space with a fluid. The device is remarkable in particular in that it comprises:

a sensor for measuring the instantaneous travel speed of the slidable element relative to the cylinder of the servo-control; and a computer provided with a processor and a main memory including instructions, the processor executing the instructions to determine the static force with the help of:

the following first relationship when the instantaneous travel speed is positive:

$$F = F_{max} * \left[1 - \left(\frac{V^2}{V_{max}^2}\right)\right]$$

the following second relationship when the instantaneous travel speed is negative:

$$F = -F_{max} * \left[1 - \left(\frac{V^2}{V_{max}^2}\right)\right]$$

where F represents the instantaneous static force developed by the servo-control, $F_{max}$ represents the predetermined maximum static force that can be developed by the servo-control, $V^2$ represents the measured instantaneous travel speed of said slidable element raised to the second power, $V^2_{max}$ represents the maximum travel speed of said slidable element relative to the cylinder raised to the second power, * represents the multiplication sign, and – represents the subtraction sign.

It should be observed that this device may be implemented on existing servo-controls, these servo-controls generally having a sensor for measuring the travel speed of the slidable element relative to the cylinder.

In another aspect, the device may include warning means connected to the computer, the processor executing the stored instructions to operate the warning means when the static force exceeds a predetermined threshold.

In addition, the invention provides a servo-control provided with an actuator and a hydraulic distributor control valve, the servo-control comprising at least one cylinder defining an inside space and a slidable member provided with a control system slidable in the inside space, the hydraulic distributor control valve feeding fluid to the inside space.

The servo-control is remarkable in particular in that it includes a device of the invention, as described above.

The invention also provides an aircraft provided with such a servo-control.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a diagram showing an aircraft of the invention;

FIGS. 3 to 5 are diagrams explaining the method of the invention.

Figure 2:
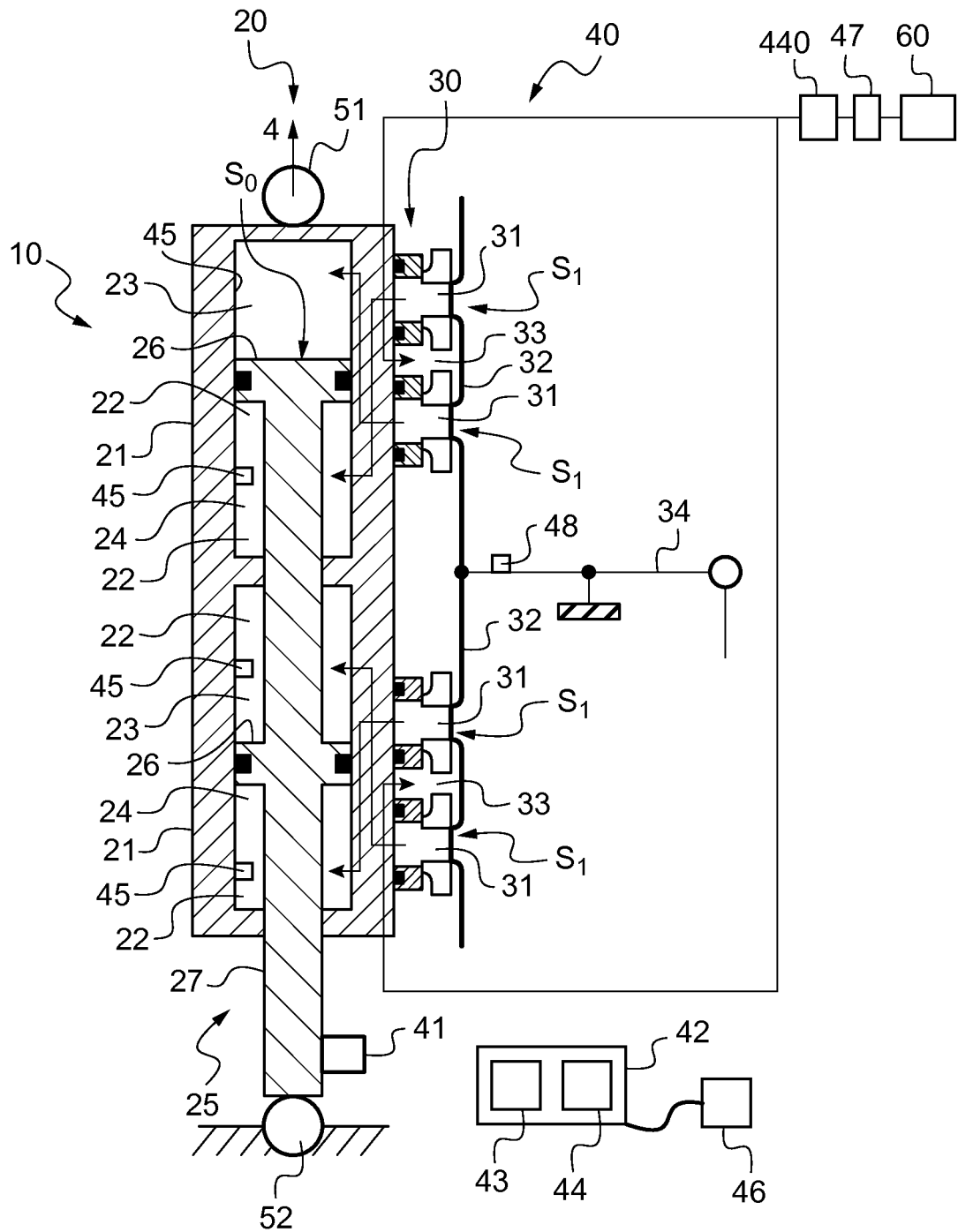
FIG. 2 is a diagram showing a servo-control provided with a static force determination device of the invention.

Elements that are present in more than one of the figures are given the same references in each of them.

DETAILED DESCRIPTION OF THE INVENTION

FIG. 1 shows an aircraft 1, and more particularly a rotorcraft having an airframe 3 carrying a main rotor 2 and a tail rotor (not shown) carried on a tail 5 of the aircraft.

The aircraft 1 then has a swashplate assembly 4 for adjusting the pitch of the blades of the main rotor 2, this swashplate assembly being controlled by three servo-controls 10 connected to flight controls that are not shown in FIG. 1.

Similarly, the control system controlling the pitch of the blades of the tail rotor may include a servo-control that is not shown in FIG. 1.

With reference to FIG. 2, each servo-control 10 of the invention comprises an actuator 20 and a hydraulic distributor control valve 30, or indeed slaving means optionally incorporated in the hydraulic distributor control valve.

The actuator 20 comprises at least one cylinder 21 co-operating with a slidable element 25. In the example shown, the actuator 20 has two cylinders 21.

In addition, each cylinder 21 defines an inside space 22. Under such circumstances, the slidable element 25 is provided with a power rod 27 carrying one piston 26 per inside space, each piston 26 sliding in the associated inside space 22. Thus, each piston 26 defines an extension chamber 23 and a retraction chamber 24 of the associated inside space.

Furthermore, the actuator 20 includes means for fastening to the aircraft, such as fastener means 51 of the cylinder 21 and fastener means 52 of the power rod 25. In the variant shown, the servo-control is a moving-cylinder servo-control, with the fastener means 52 of the power rod 25 being fastened to a stationary element while the fastener means 51 of the cylinder 21 may be fastened to the swashplate assembly 4, for example.

According to another aspect, the hydraulic distributor control valve 30 serves to convey a fluid from a hydraulic source 60 to one of the chambers of each of the inside spaces 22. Under such circumstances, the hydraulic distributor control valve 30 may comprise one hydraulic unit per inside space, each of them being controlled by a control lever 34.

For example, each hydraulic unit comprises at least one inlet passage 33 and two variable-section delivery openings 31 suitable for being in communication with the extension chamber 23 and the retraction chamber 24 of the associated inside space 22. Thereafter the control lever 34 co-operates with movable restriction means 32 capable of at least partially closing said inlet passage and said openings.

When the control lever 34 is moved to request extension of the actuator 20, the control lever 34 moves the restriction means 32 which put the inlet passage 33 into communication with the variable-section opening 31 that is connected to the extension chamber 23 of the inside space. Conversely, the variable-section opening 31 connected to the retraction chamber 24 of the inside space may be put into communication with a fluid-return hydraulic circuit.

Likewise, when the control lever 34 is moved to request retraction of the actuator 20, the control lever 34 moves the restriction means 32 so as to put the inlet passage 33 into communication with the variable-section opening 31 connected to the retraction chamber of the inside space. Conversely, the opening 31 connected to the extension chamber 23 may be put into communication with a return hydraulic circuit.

The hydraulic distributor control valve may be of the type described in the literature.

It should be observed that, at any instant, the main section of the variable-section opening 31 feeding the inside space with fluid is a section that is variable as a function of the position of the control lever 34, and thus as a function of the position of the restriction means 32.

Furthermore, the servo-control 10 includes a device 40 for determining the static force exerted on the servo-control.

The device 40 includes a computer 42 having a processor 43 and a main memory 44, the processor 43 executing instructions stored in the memory 44 in order to determine the static force.

Under such circumstances, the device 40 includes a sensor 41 for measuring the instantaneous travel speed V of the slidable element 25 relative to the cylinder 21 of the servo-control 10. The measurement sensor 41 is then connected to the computer via a wired or wireless connection (not shown in FIG. 2).

The measurement sensor 41 is optionally a sensor measuring the relative movement between the slidable element 25 and the cylinder 21. By taking the derivative of the measurements transmitted by the measurement sensor with respect to time in application of the instructions stored in the main memory 44, the processor determines the instantaneous travel speed V of the slidable element 25 relative to the cylinder 21.

With reference to FIG. 3, and according to the method that is implemented, in order to determine the static force F exerted on the servo-control 10, it is the instantaneous travel speed V of the slidable element 25 relative to the cylinder 21 that is determined.

FIG. 4 is a diagram with said instantaneous travel speed V of the slidable element 25 relative to the cylinder 21 plotted along the abscissa axis, and the static force exerted on the servo-control 10 plotted up the ordinate axis.

It can be seen that according to the invention, this static force is a function of the instantaneous travel speed V.

Thereafter, the processor 43 executes instructions stored in the main memory 44 to determine the static force in real time with the help of the following relationships giving the instantaneous static force exerted on a servo-control as a function of the instantaneous travel speed V, i.e. with the help of:

the following first relationship when the instantaneous travel speed is positive:

$$F = F_{max} * \left[1 - \left(\frac{V^2}{V_{max}^2}\right)\right]$$

the following second relationship when the instantaneous travel speed is negative:

$$F = -F_{max} * \left[1 - \left(\frac{V^2}{V_{max}^2}\right)\right]$$

where F represents the instantaneous static force developed by the servo-control 10, $F_{max}$ represents the predetermined maximum static force that can be developed by the servo-control 10, possibly expressed as an absolute value so as to be considered as being positive, $V^2$ represents the measured instantaneous travel speed of said slidable element 25 raised to the second power, $V^2_{max}$ represents the maximum travel speed of said slidable element 25 raised to the second power, and * represents the multiplication sign.

It can be seen that the graphical representation of these first and second relationships presents a first segment associated with the first relationship in a positive quadrant Q1, and a second segment associated with the second relationship in a negative quadrant Q2. It can be understood that one segment relates to extending the servo-control, while another segment relates to retracting the servo-control.

Furthermore, in the embodiment associated with FIG. 4, the maximum travel speed is a constant, equal to the maximum relative travel speed between the slidable element 25 and the cylinder 21 for a delivery opening 31 of the hydraulic distributor control valve with its variable section at its maximum and for a maximum temperature of the fluid, for example.

Nevertheless, the maximum travel speed $V_{max}$ may vary as a function of the instantaneous value of the variable section of said opening.

In a preferred embodiment, each possible value of the maximum travel speed $V_{max}$ then corresponds to an equation enabling the static force to be obtained.

FIG. 5 thus shows a diagram plotting static force as a function of the travel speed of the slidable element 25 relative to the cylinder 21.

In this preferred embodiment, it can be seen that are a plurality of segments in each quadrant Q1, Q2, each segment of a quadrant corresponding to an opening of a given section. It can also be understood that the greater the section of the opening, the greater the maximum travel speed.

Thus, in this second embodiment, an instantaneous value is determined for the variable section of the opening of the hydraulic distributor control valve 30 feeding fluid to the inside space.

Thereafter, the maximum travel speed $V_{max}$ is determined in real time using the following equation:

$$V_{max} = C_q * S_1 * \frac{\sqrt{\left(\frac{2}{\rho}\right) * (P_{in} - P_{out})}}{S_0}$$

where $C_q$ represents a predetermined head loss coefficient of the hydraulic distributor control valve 30, $S_1$ represents an instantaneous value of the variable section of the opening 31 feeding fluid to the inside space, $\rho$ represents the density of the fluid, $P_{in}$ represents the feed pressure of the fluid entering into the hydraulic distributor control valve 30, $P_{out}$ represents the outlet pressure of the fluid leaving the hydraulic distributor control valve, and thus the pressure of the fluid present in the chamber 23, 24 of the inside space 22 that is fed by the hydraulic distributor control valve 30, $S_0$ represents the area of a constant section of said piston 26, and * represents the multiplication sign.

With reference to FIG. 2, the device 40 may then include an opening sensor 48 to determine the instantaneous value of the variable section of the opening of the hydraulic distributor control valve feeding fluid to the inside space.

The opening sensor 48 may be a sensor for sensing the position of the control lever 34 and it may be connected to the computer via a connection that is not shown in the figures, i.e. a wired or wireless connection.

As a function of the position of the control lever, the processor executes instructions from the main memory in order to deduce therefrom the instantaneous value of $S_1$.

Furthermore, the device 40 includes a first pressure sensor 440 for sensing the feed pressure Pin, which sensor is connected to the computer 42 by wired or wireless connections (not shown). Similarly, the device 40 may include at least one second pressure sensor 45 for sensing the outlet pressure Pout and connected to the computer 42 by wired or wireless connections (not shown in the figures), with a plurality of sensors being arranged in each extension and retraction chamber 23 and 24 of the cylinder 21, for example.

The computer can then act in real time to determine the maximum travel speed associated with a given position of the hydraulic distributor control valve 30 using the equation programmed in its main memory 44 so as to deduce therefrom the static force exerted on the servo-control.

It should be observed that in order to simplify the device 40, it is possible to assume that the outlet pressure $P_{out}$ is proportional to half the inlet pressure $P_{in}$ multiplied by a given proportionality ratio, or indeed equal to half the inlet pressure $P_{in}$. Under such circumstances, there is no need to implement at least one second pressure sensor.

Furthermore, in order to increase the accuracy of the device 40, the device 40 may include a temperature sensor 47 for sensing the temperature of the fluid fed to the hydraulic distributor control valve 30.

Using this fluid temperature and appropriate equations, the processor of the computer 42 executes instructions to determine the head loss coefficient $C_q$ and the density $\rho$ as a function of the measured temperature, with the help of conventional means such as databases, charts, or equations, for example.

Finally, the device 40 may include warning means 46. Under such circumstances, the warning means 46 may be activated when the static pressure exceeds a predetermined threshold.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of determining the static force developed by a servo-control having an actuator and a hydraulic distributor control valve, said actuator comprising at least one cylinder defining an inside space and a slidable element provided with a control piston slidable in said inside space, said hydraulic distributor control valve feeding said inside space with a fluid, and the method comprising the following steps:

determining an instantaneous travel speed of said slidable element relative to said cylinder of the servo-control; and determining said static force with the help of:

the following first relationship when the instantaneous travel speed is positive:

$$F = F_{max} * \left[1 - \left(\frac{V^2}{V^2_{max}}\right)\right]$$

the following second relationship when the instantaneous travel speed is negative:

$$F = -F_{max} * \left[1 - \left(\frac{V^2}{V^2_{max}}\right)\right]$$

where F represents an instantaneous static force developed by the servo-control, $F_{max}$ represents a predetermined maximum static force that can be developed by the servo-control, $V^2$ represents the measured instantaneous travel speed of said slidable element raised to the second power, $V^2_{max}$ represents a maximum travel speed of said slidable element relative to said cylinder raised to the second power, and * represents the multiplication sign.

2. A method according to claim 1, comprising the following steps:

determining the instantaneous travel speed (V) of said slidable element relative to said cylinder of the servo-control with the help of a sensor for measuring the travel speed; and using a computer comprising a processor and a main memory storing instructions relating to said first relationship and to said second relationship to determine said static force with the help of said first relationship and said second relationship by executing said instructions by means of said processor.

3. A method according to claim 1, wherein said instantaneous travel speed (V) is determined in real time by determining a fluid flow rate, and then said flow rate is divided by the area ($S_0$) of a constant section of the piston.

4. A method according to claim 1, wherein said hydraulic distributor control valve communicates with said inside space via an opening of variable section, with said hydraulic distributor control valve including movable restriction means in order to adjust said variable section, and an instantaneous value of the variable section of the hydraulic distributor control valve is determined and then the maximum travel speed ($V_{max}$) is determined in real time using the following equation:

$$V_{max} = C_q * S_1 * \frac{\sqrt{\left(\frac{2}{\rho}\right) * (P_{in} - P_{out})}}{S_0}$$

where $C_q$ represents a predetermined head loss coefficient of the hydraulic distributor control valve, $S_1$ represents an instantaneous value of the variable section, $\rho$ represents a density of the fluid, $P_{in}$ represents a feed pressure of a fluid entering into the hydraulic distributor control valve, $P_{out}$ represents an outlet pressure of a fluid leaving the hydraulic distributor control valve, $S_0$ represents an area of a constant section of said piston, and * represents the multiplication sign.

5. A method according to claim 4, wherein the maximum travel speed $V_{max}$ is determined in real time with the help of the equation by executing instructions with a processor of a computer.

6. A method according to claim 4, wherein the outlet pressure ($P_{out}$) is proportional to the inlet pressure ($P_{in}$).

7. A method according to claim 4, wherein the temperature of said fluid is measured, said head loss coefficient ($C_q$) and said density ($\rho$) being determined as a function of said temperature.

8. A method according to claim 1, wherein a warning is triggered when said static force (F) exceeds a predetermined threshold.

\* \* \* \* \*